(12) United States Patent
Darzi

(10) Patent No.: US 9,796,042 B2
(45) Date of Patent: Oct. 24, 2017

(54) MATERIAL JOINING HEAD ASSEMBLY

(71) Applicant: GM GLOBAL TECHNOLOGY OPERATIONS LLC, Detroit, MI (US)

(72) Inventor: Ayad K. Darzi, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1113 days.

(21) Appl. No.: 13/962,430

(22) Filed: Aug. 8, 2013

(65) Prior Publication Data
US 2015/0041443 A1 Feb. 12, 2015

(51) Int. Cl.
| | | |
|---|---|---|
| *B23K 15/00* | (2006.01) | |
| *B23K 1/005* | (2006.01) | |
| *B23K 26/06* | (2014.01) | |
| *B23K 26/14* | (2014.01) | |
| *B23K 26/242* | (2014.01) | |
| *B23K 26/211* | (2014.01) | |

(52) U.S. Cl.
CPC ........ *B23K 15/0046* (2013.01); *B23K 1/0056* (2013.01); *B23K 26/0648* (2013.01); *B23K 26/14* (2013.01); *B23K 26/147* (2013.01); *B23K 26/1476* (2013.01); *B23K 26/211* (2015.10); *B23K 26/242* (2015.10)

(58) Field of Classification Search
CPC .. B23K 1/0056; B23K 26/0648; B23K 26/14; B23K 26/211; B23K 26/1476; B23K 15/0046; B23K 26/242; B23K 26/147
USPC ............ 219/121.13, 121.64, 121.61, 121.63, 219/121.79, 121.83, 121.67, 121.76, 219/121.78, 121.81, 121.82
See application file for complete search history.

(56) References Cited

U.S. PATENT DOCUMENTS

| | | | |
|---|---|---|---|
| 5,001,324 A * | 3/1991 | Aiello | B23K 26/04 |
| | | | 219/121.63 |
| 5,925,268 A * | 7/1999 | Britnell | B23K 26/032 |
| | | | 219/121.63 |
| 6,596,962 B2 | 7/2003 | Haschke | |
| 2011/0024402 A1* | 2/2011 | Hozumi | B23K 26/14 |
| | | | 219/121.63 |

FOREIGN PATENT DOCUMENTS

| | | |
|---|---|---|
| CN | 1474731 A | 2/2004 |
| CN | 201217126 Y | 4/2009 |
| CN | 201783762 U | 4/2011 |

(Continued)

OTHER PUBLICATIONS

Chen Yanbin, Summary of Modern Laser Welding Technology, Oct. 2015, Science Press, China.

*Primary Examiner* — Phuong Nguyen
(74) *Attorney, Agent, or Firm* — Quinn IP Law

(57) ABSTRACT

A material joining end effector generally includes a first arm, an optics assembly, a clamp, and a second arm. The first arm elongated along a longitudinal axis. The optics assembly is configured to focus an energy beam. The clamp is movably coupled to the first arm, the clamp being configured to move along a direction substantially parallel to the longitudinal axis. The second arm is rotationally coupled to the first arm, the second arm being configured to rotate relative to the first arm. The clamp is configured to removably couple the optics assembly to the first arm to allow the optics assembly to be decoupled from the first arm.

10 Claims, 2 Drawing Sheets

(56) References Cited

FOREIGN PATENT DOCUMENTS

| CN | 102837112 A | 12/2012 |
|---|---|---|
| CN | 103111767 A | 5/2013 |
| DE | 3905684 A1 | 8/1990 |
| DE | 4415035 A1 | 11/1995 |
| EP | 0838297 A1 | 4/1998 |
| JP | 11347774 A | 12/1999 |
| JP | 2010284696 A | 12/2010 |
| JP | 2012024777 A | 2/2012 |
| JP | 2013128968 A | 4/2013 |
| KR | 1020040077232 A | 9/2004 |

* cited by examiner

MATERIAL JOINING HEAD ASSEMBLY

TECHNICAL FIELD

The present disclosure relates to methods and assemblies for joining two workpieces together using welding, soldering or brazing.

BACKGROUND

Welding, soldering, and brazing are commonly used to attach workpieces together, particularly in the manufacturing of vehicle bodies. For example, two or more metal panels may be attached together using welding, soldering, or brazing.

SUMMARY

The present disclosure relates to material joining end effectors for brazing, soldering or welding two or more workpieces. As used herein, a "material joining end effector" refers to, for example, a head or end portion of a tool capable of attaching two joining workpieces together. In an embodiment, the material joining end effector includes an optics assembly movable relative to the workpieces in order to change the shape, focus, or position of a laser beam relative to the workpieces. The material joining end effector may include a first arm, an optics assembly, a clamp, and a second arm. The first arm is elongated along a longitudinal axis. The optics assembly is configured to focus an energy beam. The clamp is movably coupled to the first arm. The clamp is configured to move along a direction substantially parallel to the longitudinal axis so as to focus the laser beam. The second arm is rotationally coupled to the first arm. The second arm is configured to rotate relative to the first arm. The clamp is configured to removably couple the optics assembly to the first arm to allow the optics assembly to be decoupled from the first arm.

In an embodiment, the end effector may further include a filler material holder coupled to the second arm. The filler material holder may be movably coupled to the second arm. The filler material holder may be pivotally coupled to the second arm. The end effector may further include an intermediate arm section coupled between the first arm and the second arm. The intermediate arm section may be movably coupled to the first arm. The intermediate arm section may be a plate and may be configured to pivot relative to the first arm. The intermediate arm section may be movably coupled to the second arm. The intermediate arm section may be pivotally coupled to the second arm. The end effector may further include a movable coupler coupled between the clamp and the first arm. The movable coupler is configured to move relative to the first arm in the direction substantially parallel to the longitudinal axis.

In an embodiment, the material joining end effector includes an optics assembly. The optics assembly is configured to focus a laser beam. The end effector further includes a first arm elongated along a longitudinal axis. The end effector additionally includes a optics holder supporting the optics assembly. The optics holder is coupled to the first arm. The end effector further includes a second arm, an intermediate arm section, and a filler material holder. The intermediate arm section is movably coupled between the first arm and the second arm. The filler material holder is coupled to the second arm. The end effector further includes a filler material wire supported by the filler material holder. The second arm is configured to pivot relative to the intermediate arm section to move the filler material holder with respect to the optics assembly in order to adjust an angle of incidence defined between the laser beam and a filler material wire held by the filler material holder.

In an embodiment, the optics holder is configured to move along a direction substantially parallel to the longitudinal axis so as to change the focus of the laser beam. The filler material holder may be movably coupled to the second arm. The filler material holder is pivotally coupled to the second arm. The optics holder may be configured as a clamp.

The end effector may further include a movable coupler coupled between the first arm and the optics holder. The movable coupler may be slidably coupled to the first arm. The first arm may define a slot, and the movable coupler may include a protrusion slidably disposed in the slot. The intermediate arm section may be a plate. The plate may be movably coupled to the first arm. The plate may be pivotally coupled to the first arm. The optics holder may be configured to detachably couple the optic assembly to the first arm.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
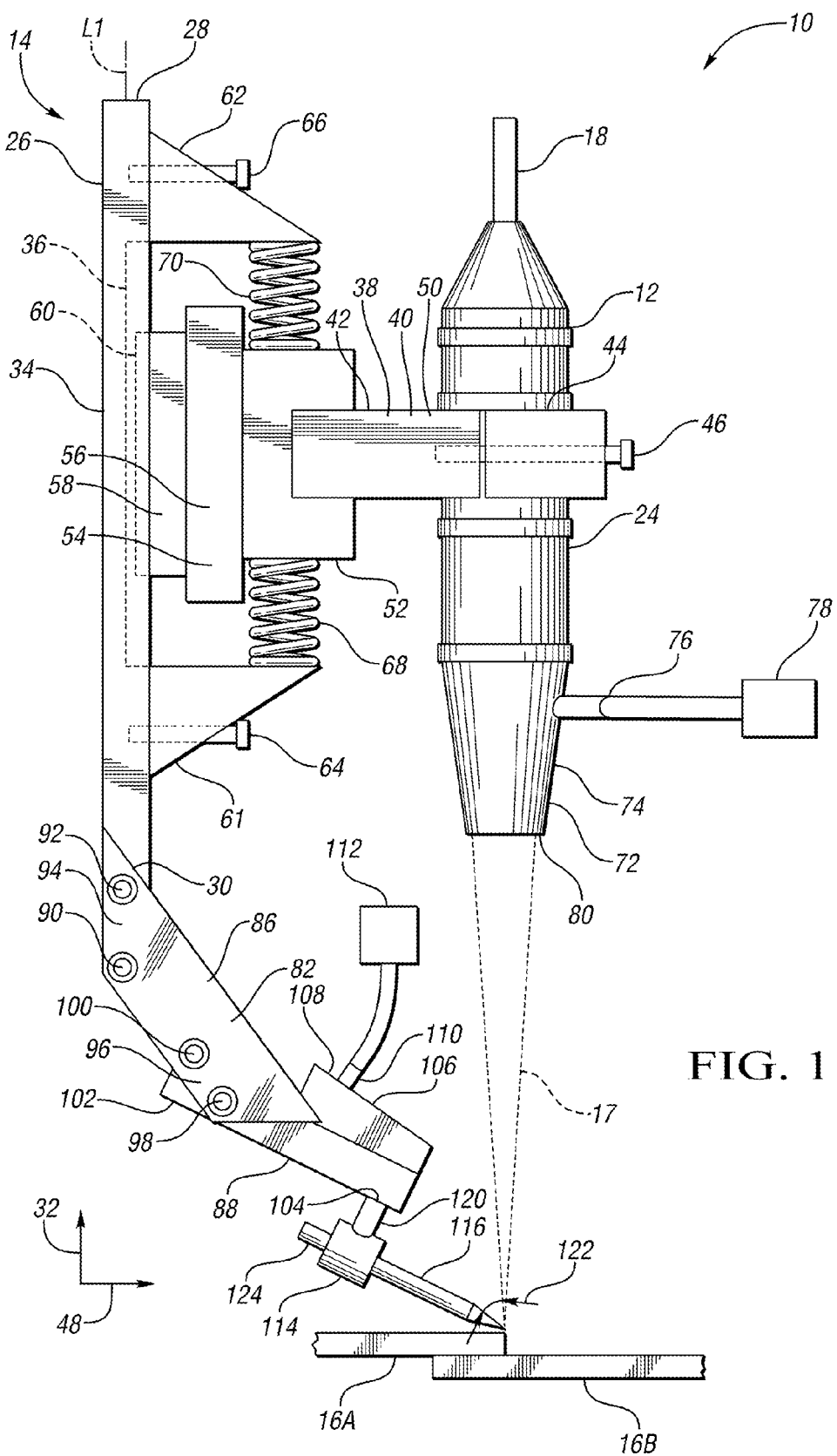
FIG. 1 is a schematic front view of an end effector for welding, soldering, or brazing two or more workpieces.

Referring now to the drawing, FIG. 1 illustrates a material joining end effector or head 10 can be used for welding, brazing, or soldering two workpieces 16A, 16B made, for example, of a metallic material. As used herein, the term "material joining end effector" refers to an end portion of a tool capable of attaching two workpieces together. The end effector 10 may be coupled to a robotic arm (not shown) capable of moving the end effector 10 along a desired path. The end effector 10 includes an optics assembly 12 and an arm assembly 14. The optics assembly 12 is configured to focus, shape, or modify a laser beam 17 or any other energy beam. The arm assembly 14 is configured to hold and adjust the position of the optics assembly 12 relative to the workpieces 16A, 16B.

Figure 2:
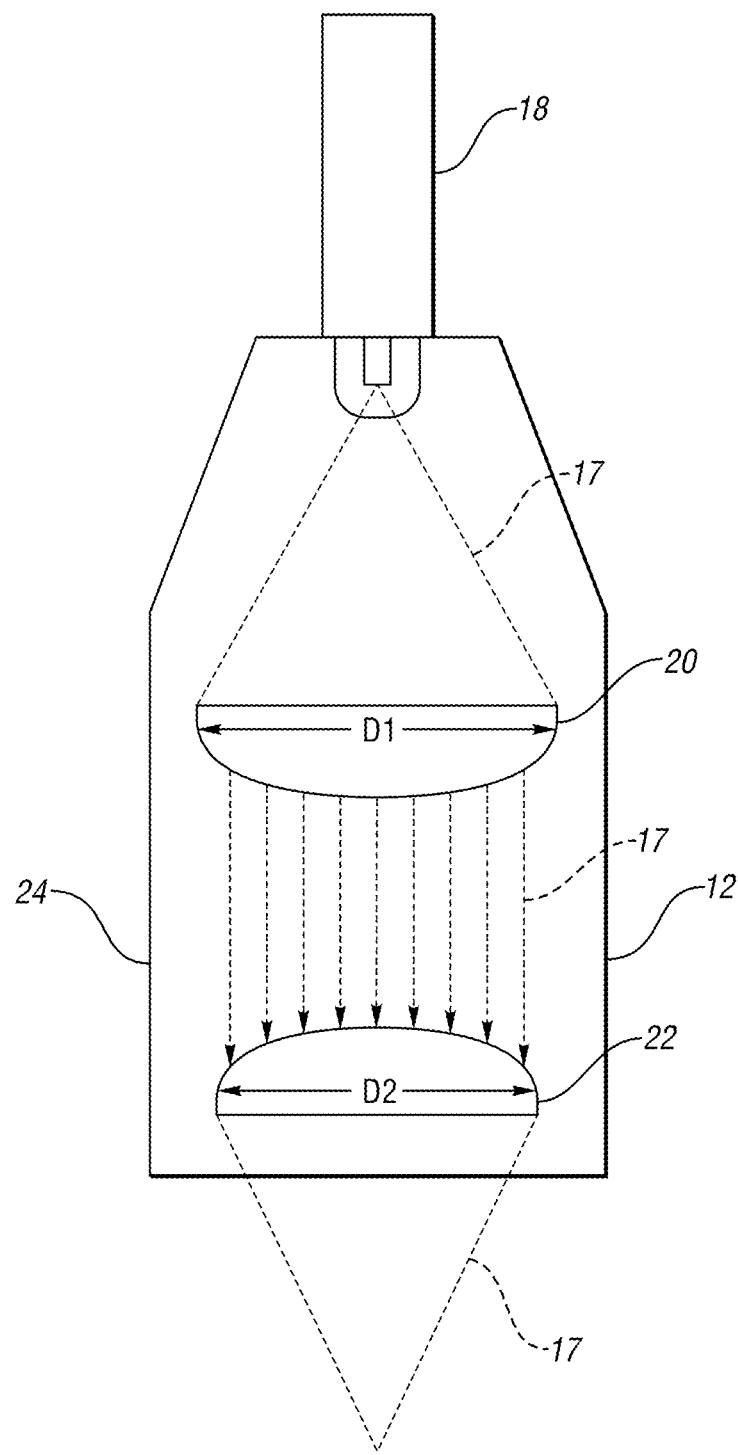
FIG. 2 is a schematic sectional view of an optics assembly of the end effector shown in FIG. 1.

With reference to FIG. 2, the optics assembly 12 may include multiple lenses capable of modifying the laser beam 17. For example, in the depicted embodiment, the optics assembly 12 includes an optical housing 24, one or more negative lenses 20 configured to collimate the laser beam 17 emitted by a laser source 18, and one or more positive lenses 22 configured to converge the laser beam collimated by the negative lens 20. The optical housing 24 holds and contains the negative lens 20 and the positive lens 22. The negative lens 20 may have a first diameter D1, which may be about 2 inches. The positive lens 22 may define a second diameter D2, which may also be about 2 inches. The first diameter D1 and the second diameter D2 of each negative lens 20 and each positive lens 22, respectively, may be about to 2 inches in order to maximize the laser damage threshold. For example, the first diameter D1 and the second diameter D2 may range between 1.5 and 2.5 inches. The optics assembly 12 may be devoid of mirrors in order to reduce optical losses, minimize optical surface damage, and eliminate, or at least minimize, distortion in the laser beam 17 caused by a damaged optical surface.

Referring again to FIG. 1, the arm assembly 14 can adjust the position of the optics assembly 12 relative to the workpieces 16A, 16B in order to adjust the focus of the laser beam 17. To do so, the arm assembly 12 includes a first arm 26 and an optics holder 38 movably coupled to the first arm 26. The optics holder 38 can move along a first or vertical direction indicated by arrow 32 in relation to the first arm 26. The optics holder 38 can removably couple the optics assembly 12 to the arm assembly 14.

The optics holder 38 can be configured as a clamp mechanism 50 including a clamp 40 and a clamp support 52 configured to support the clamp 40. The clamp 40 is fixed to the clamp support 52 and can be unlocked to decouple the optics assembly 12 from the arm assembly 14. Accordingly, instead of replacing the entire end effector 10, users can only replace the optics assembly 12 with a different optics assembly suitable for a different application (e.g., soldering, brazing, or welding).

With continued reference to FIG. 1, the clamp 40 may include, for example, a first clamp section 42, a second clamp section 44, and a clamp fastener 46, such as a screw, interconnecting the first clamp section 42 and the second clamp section 44. The clamp fastener 46 may be decoupled from at least one of the first clamp section 42 and the second clamp section 44 to unlock the clamp 40. Specifically, after the clamp fastener 46 is decoupled, the first clamp section 42 and the second clamp section 44 can be separated from each other, thereby allowing the optics assembly 12 to be decoupled from the arm assembly 14. It is envisioned that the portions of the clamp 40, such as the first clamp portion 42 and the second clamp portion 44, may be adjusted to allow the optics assembly 12 to be repositioned along the first or vertical direction indicated by arrow 32, a second or horizontal direction indicated by arrow 48, and another direction (not shown) substantially perpendicular to the first direction indicated by arrow 32 and the second direction indicated by arrow 48. The second direction indicated by arrow 48 may be substantially perpendicular to the first direction indicated by arrow 32. As discussed above, the end effector 10 may include any optics holder 38 capable of removably coupling the optics assembly 12 of the to the arm assembly 14.

The end effector 10 further includes a shield nozzle 72 coupled to the optics assembly 12 and configured to protect the optics assembly 12 from contamination. The shield nozzle 72 includes a first nozzle body 74 and a nozzle conduit 76 in fluid communication with a low pressure gas/air source 78. The first nozzle body 74 is substantially hollow. The nozzle conduit 76 can communicate low pressure gas/air from the low pressure gas source 78 to the first nozzle body 74. The low pressure gas/air source 78 can supply the shield nozzle 72 with low pressure gas/air having a pressure of 30 pounds per square inch (psi) or less. During operation, the low pressure gas/air travels from the low pressure gas source 78 to the first nozzle body 74 via the nozzle conduit 76. The low pressure gas then exits the first nozzle body 74 via a nozzle opening (not shown) located at an edge 80 of the shield nozzle 72.

In addition, the arm assembly 14 includes a first arm 26 elongated along a first longitudinal axis L1 and having a first or upper arm end portion 28 and a second or lower arm end portion 30 opposite the first arm end portion 28. The first arm end portion 28 may be spaced along from the second arm end portion 30 along the first or vertical direction indicated by arrow 32. The first direction indicated by arrow 32 may be substantially parallel to the first longitudinal axis L1. Further, the first arm end portion 28 may be coupled to a robotic arm (not shown), thereby allowing the movement of the arm assembly 14 relative to the workpieces 16A, 16B to be controlled by the robotic arm (not shown). The first arm 26 includes a first arm body 34 and defines a slot 36 extending into the first arm body 34. The slot 36 may be elongated along the first direction indicated by arrow 32 or along the first longitudinal axis L1.

The arm assembly 14 further includes a movable coupler 54 coupled between the optics holder 38 and the first arm 26. The movable coupler 54 can move relative to the first arm 26, causing the optics assembly 12 held by the optics holder 38 to move relative to the first arm 26. The movable coupler 54 may include a first coupler portion 56 directly connected to the clamp support 52 and a second coupler portion 58 coupled between the first coupler portion 56 and the first arm 26. In addition, the movable coupler 54 includes a protrusion 60 extending from the second coupler portion 58. The protrusion is slidably disposed in the slot 36, thereby allowing the movable coupler 54 to slide relative to the first arm 26. The sliding movement of the movable coupler 54 relative to the first arm 26 allows the optics assembly 12 held by the optics holder 38 to translate relative to the first arm 26.

The arm assembly 14 further includes a first arm support 61 and a second arm support 62 spaced apart from each other along the first direction indicated by arrow 32. Each of the first arm support 61 and second arm support 62 is coupled to the first arm 26. For instance, a first support fastener 64 can couple the first arm support 61 to the first arm 26, and a second support fastener 66 can couple the second arm support 62 to the first arm 26. A first biasing member 68, such as a coil spring, is coupled between the first arm support 61 and a portion of the optics holder 38, such as the clamp support 52. A second biasing member 70, such as a coil spring, is coupled between the second arm support 62 and a portion of the optics holder 38 such as the clamp support 52. The first biasing member 68 and the second biasing member 70 are configured to bias the first arm 26 toward the first direction indicated by arrow 32 to maintain the movable coupler 54 at a certain location relative to the first arm 26 when the movable coupler 54 is spatially fixed to the second arm 26 by the first support fastener 64 and the second support fastener 66.

During operation, movable coupler 54 can be moved relative to the first arm 26 to adjust the position of the optics assembly 12. Once the optics assembly 12 is in the desired position, the first arm support 61 and the second arm support 62 are locked to the first arm 26 using the first support fastener 64 and the second support fastener 66, respectively, in order to fix the position of the optics assembly 12 with respect to the first arm 26.

The arm assembly 14 further includes an intermediate arm section 86 interconnecting the first arm 26 and a second arm 88. The intermediate arm section 86 can be configured as a plate 82 and is rotationally coupled to first arm 26 at or near the second arm end portion 30. For instance, arm assembly 14 may include a first pivot pin 90 or any other suitable coupler pivotally connecting the intermediate arm section 86 to the first arm 26. Accordingly, the intermediate arm section 86 can pivot about the first pivot pin 90 relative to the first arm 26. Because the second arm 88 is coupled to the first arm 26 via the intermediate arm section 86, the second arm 88 can also rotate or pivot relative to the first arm 26. The arm assembly 14 further includes a first arm fastener 92, such as a screw, configured to fix the position of the intermediate arm section 86 relative to the first arm 26. The intermediate arm section 86 may also be referred to as a third arm.

The intermediate arm section 86 includes a first intermediate arm end portion 94 end and a second intermediate arm end portion 96. The first arm fastener 92 can be coupled to the first intermediate arm section 86 at or near the first intermediate arm end portion 94. Moreover, the first pivot pin 90 is coupled to the intermediate arm section 86 at or near the first intermediate arm end portion 94.

The intermediate arm section 86 may be movably coupled to the second arm 88 at or near the second intermediate arm end portion 96. Specifically, the intermediate arm section 86 may be rotationally coupled to the second arm 88. As such, the intermediate arm section 86 can rotate relative to the second arm 88. Alternatively or additionally, the second arm 88 can translate relative to the intermediate arm section 86. In the depicted embodiment, the arm assembly 14 includes a second pivot pin 98 or any other suitable coupler pivotally connecting the second arm 88 to the intermediate arm section 86. Consequently, the second arm 86 can pivot relative to the intermediate arm section 86. The second arm 88 is configured to pivot relative to the intermediate arm section 86 to move the filler material holder 114 with respect to the optics assembly 12 in order to adjust an angle of incidence 122 defined between the laser beam 17 (or any other energy beam 15) and a filler material wire 124 held by the filler material holder 114. The arm assembly 14 may further include a second arm fastener 100, such a screw, configured to fix the position of the second arm 88 relative to the intermediate arm section 86.

As discussed above, the second arm 88 can move relative to the intermediate arm section 86 and includes a first arm terminal portion 102 and a second arm terminal portion 104 opposite the first terminal portion 102. The second pivot pin 98 and the second arm fastener 100 may be coupled to the second arm 88 at or near the first arm terminal portion 102.

The end effector 10 further includes an air knife assembly 106 coupled to the second arm 88. The air knife assembly 106 can protect the optics assembly 12 from contamination by shooting a stream of high pressure gas/air toward the laser beam 17. The air knife assembly 106 includes a second nozzle body 108 and a channel 110 in fluid communication with the second nozzle body 108. The second nozzle body 108 is substantially hollow and is configured to receive high pressure gas from a high pressure gas source 112 via the channel 110. The high pressure gas source 112 contains high pressure gas/air having a pressure of 90 pounds per square inch (psi) or more.

The arm assembly 14 includes a filler material holder 114 configured to hold a filler material structure 116 such as a filler material wire 124. The filler material structure 116 may be made of a filler material suitable for use in brazing, welding, or soldering such as a pure metal or a metal alloy. The filler material holder 114 is coupled to the second arm 88. Further, the filler material holder 114 may be movably coupled or stationary fixed to the second arm 88. For example, the filler material holder 114 may be configured to rotate or translate relative to the second arm 88. The arm assembly 14 may further includes an arm coupler 120, such as a pivot pin or a sliding pin, connecting the filler arm holder 114 to the second arm 88. Consequently, filler arm holder 114 can be movably couple to the second arm 88. For instance, the arm coupler 120 can be configured as a pivot pin and the filler arm holder 114 can therefore pivot relative to the second arm 88 to adjust an angle of incident 122 defined between the laser beam 17 and the filler material structure 116. Alternatively or additionally, the filler arm holder 114 can translate relative to the second arm 88. Alternatively, the arm coupler 120 can maintain the second arm holder 114 at a fixed position relative to the second arm 88.

During operation, laser beam 17 is emitted by the laser source 18. The optics assembly 12 then focus the laser beam 17 toward workpieces 16A, 16B defined between the two adjacent workpieces 16A, 16B and toward the filler material structure 116. The laser beam 17 heats the filler material structure 116 until the filler material structure 116 melts. Eventually, the filler material structure 116 cools and solidifies, thus joining the two workpieces 16A, 16B together.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A material joining end effector, comprising;
   an optics assembly configured to focus a laser beam;
   a first arm elongated along a vertical axis;
   an optics holder supporting the optics assembly, the optics holder being coupled to the first arm;
   a second arm;
   an intermediate arm section movably coupled between the first arm and the second arm;
   a filler material holder coupled to the second arm;
   a filler material wire supported by the filler material holder;
   a movable coupler coupled between the first arm and the optics holder, wherein the movable coupler is slidably coupled to the first arm;
   wherein the second arm is configured to pivot relative to the intermediate arm section to move the filler material holder with respect to the optics assembly in order to adjust an angle of incidence defined between the laser beam and the filler material wire held by the filler material holder;
   wherein the first arm defines a slot, the movable coupler includes a protrusion slidably disposed in the slot, the optics holder is configured as a clamp, the clamp is movably coupled to the first arm, the clamp is configured to move along a direction parallel to the vertical axis;
   a clamp support configured to support the clamp, wherein the clamp is fixed to the clamp support;
   a first arm support coupled to the first arm;
   a second arm support coupled to the first arm;
   a first support fastener coupling the first arm support to the first arm;
   a second support fastener coupling the second arm support to the first arm;
   a first biasing member coupled between the first arm support and the clamp support;
   a second biasing member coupled between the second arm support and the clamp support; and
   wherein the first arm support is spaced apart from the second arm support along the direction.

2. The material joining end effector of claim 1, wherein the filler material holder is movably coupled to the second arm.

3. The material joining end effector of claim 2, wherein the filler material holder is pivotally coupled to the second arm.

4. The material joining end effector of claim 1, wherein the intermediate arm section is a plate.

5. The material joining end effector of claim 4, wherein the plate is movably coupled to the first arm.

6. The material joining end effector of claim 5, wherein the plate is pivotally coupled to the first arm.

7. The material joining end effector of claim 1, wherein the optics holder is configured to detachably couple the optic assembly to the first arm.

8. The material joining end effector of claim 1, wherein the optics assembly includes an optical housing, a positive lens disposed inside the optical housing, and a negative lens disposed inside the optical housing, the negative lens is configured to collimate the laser beam, the positive lens is configured to converge the laser beam collimated by the negative lens, the negative lens has a first diameter, the first diameter is two inches, the positive lens has a second diameter, the second diameter is two inches, and the optics assembly is devoid of mirrors.

9. The material joining end effector of claim 8, further comprising a shield nozzle coupled to the optics assembly, the shield nozzle includes a first nozzle body and a nozzle conduit coupled to the first nozzle body, and the material joining end effector further includes an air source in fluid communication with the nozzle conduit, the material joining end effector further includes an air knife assembly coupled to the second arm, the air knife assembly includes a second nozzle body and a channel in fluid communication with the second nozzle body, and the material joining end effector further includes a gas source coupled to the channel.

10. The material joining end effector of claim 9, further comprising a first pivot pin and a second pivot pin, wherein the first pivot pin pivotally couples the intermediate arm section to the first arm, and the second pivot pin pivotally couples the intermediate arm section to the second arm, the movable coupler includes a first coupler portion directly connected to the clamp support, the movable coupler includes a second coupler portion coupled between the first coupler portion and the first arm, and the protrusion extends from the second coupler portion.

* * * * *